US008706937B2

(12) United States Patent
Cruickshank et al.

(10) Patent No.: US 8,706,937 B2
(45) Date of Patent: Apr. 22, 2014

(54) METHOD AND SYSTEM OF DEBUGGING MULTICORE BUS TRANSACTION PROBLEMS

(75) Inventors: Brian Cruickshank, Oakville (CA); David Quintin Bell, Frederick, MD (US); Samuel Paul Visalli, Richardson, TX (US); Chunhua Hu, Plano, TX (US); Akila Subramaniam, Dallas, TX (US); Charles Fuoco, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 99 days.

(21) Appl. No.: 13/329,261

(22) Filed: Dec. 17, 2011

(65) Prior Publication Data

US 2012/0226837 A1 Sep. 6, 2012

Related U.S. Application Data

(60) Provisional application No. 61/448,274, filed on Mar. 2, 2011.

(51) Int. Cl.
*G06F 13/00* (2006.01)

(52) U.S. Cl.
USPC .............................. 710/110; 712/227; 714/20

(58) Field of Classification Search
USPC ......... 710/110; 714/25, 30, 31, 37, 38.14, 43, 714/724; 712/227
See application file for complete search history.

(56) References Cited

U.S. PATENT DOCUMENTS

| 6,141,757 | A * | 10/2000 | Seeker et al. ................... 726/22 |
| 6,269,454 | B1 * | 7/2001 | Mann et al. ..................... 714/25 |
| 7,024,588 | B2 * | 4/2006 | Imai et al. ....................... 714/28 |
| 7,434,103 | B2 * | 10/2008 | Suzuki et al. .............. 714/38.13 |
| 2003/0204650 | A1 * | 10/2003 | Ganasan et al. ................ 710/15 |
| 2005/0166098 | A1 * | 7/2005 | Davis .............................. 714/45 |
| 2005/0289515 | A1 * | 12/2005 | Sudo et al. .................... 717/124 |
| 2012/0226838 | A1 * | 9/2012 | Visalli et al. .................. 710/110 |
| 2012/0226839 | A1 * | 9/2012 | Fuoco et al. .................. 710/110 |
| 2012/0246369 | A1 * | 9/2012 | Takeuchi ...................... 710/110 |

\* cited by examiner

*Primary Examiner* — Glenn A Auve
(74) *Attorney, Agent, or Firm* — Robert D. Marshall, Jr.; W. James Brady; Frederick J. Telecky, Jr.

(57) ABSTRACT

A bus monitoring and debugging system operating independently without impacting the normal operation of the CPU and without adding any overhead to the application being monitored. Users are alerted to timing problems as they occur, and bus statistics that are relevant to providing insight to system operation are automatically captured. Logging of relevant events may be enabled or disabled when a sliding time window expires, or alternatively by external trigger events.

24 Claims, 3 Drawing Sheets

METHOD AND SYSTEM OF DEBUGGING MULTICORE BUS TRANSACTION PROBLEMS

CLAIM OF PRIORITY

The application claims priority under 35 USC 119(e) (1) to U.S. Provisional Application No. 61/448,247 filed Mar. 2, 2011.

TECHNICAL FIELD OF THE INVENTION

This invention relates in general to the field of multicore computing systems and more particularly to debugging bus transactions.

BACKGROUND OF THE INVENTION

In complex multicore System on a Chip devices, data movement is often handled by peripherals or dedicated hardware engines such as DMA engines that are programmed by software instructions on one of the CPUs in the device. It is very difficult to debug problems associated with incorrect programming of these peripherals or hardware engines, since the data transactions may impact the operation of CPUs other than the one that was responsible for programming the device, or have system-level consequences that are not visible from the perspective of the debug tools attached to any of the CPUs.

Consequences include both correctness issues (where the operation of the device is incorrect because of the problem) and performance issues (where the real-time behavior of the device is impacted in a way that prevents it from completing its tasks in a timely manner). Multicore performance issues in particular require real-time debugging techniques that do not involve halting any of the CPUs (as is typically done when a breakpoint is hit, for example).

A specific example of the type of problem that is particularly hard to debug is when data used for interprocessor communication is transferred by a DMA engine and the data arrives after a real-time deadline requires it to arrive. Determining why the data arrived late requires insight into the real-time behavior of the software that programmed the transaction, the other transactions handled by the DMA engine, bus contention, cache behavior, and the operation of software on the various CPUs.

SUMMARY OF THE INVENTION

One of the unique aspects of the solution is the ability of the CP_Tracer's sliding time window counter to automatically collect bus transaction statistics and exports them as hardware events over the System Trace only if a deadline is missed. If the time window expires before the transaction has completed, then the event that is logged by CP_Tracer allows external tooling to trigger on the event and automatically display information about the occurrence to users via a PC.

The ability to log the events to a local memory buffer allows the events to be exported via Ethernet or some other transport to a remote PC so that multicore systems can be monitored in the field without any special logic analyzers or In-circuit emulators attached. The host-based tooling can provide views that display the amount of data transferred by the DMA vs. the expected amount of data, as well as all of the other related statistics and hardware events leading up to the problem.

BRIEF DESCRIPTION OF THE DRAWINGS

These and other aspects of this invention are illustrated in the drawings, in which.

DETAILED DESCRIPTION OF PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
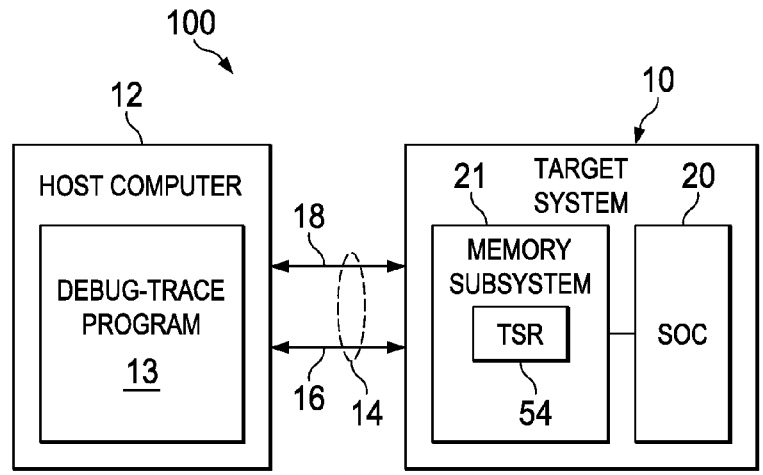
FIG. 1 shows a generalized block diagram of a system.

FIG. 1 illustrates a software development system 100 in accordance with embodiments of the invention. The software development system 100 comprises a target system 10 coupled to a host computer 12. The target system 10 may be any processor-based system upon which a software programmer would like to test and/or debug a computer program. The target system 10 may be, for example, a cellular telephone, a BLACKBERRY® device, or a computer system. In some embodiments, the host computer 12 stores and executes a program that is used for software debugging (e.g., gather trace data and produce trace displays), and thus is referred to herein as a software debugger program or a debug-trace program 13.

The host computer 12 and target system 10 couple by way of one or more interconnects 14, such as cables. In some embodiments, the host computer 12 couples to target system 10 by way of one or more multi-pin cables 16. Each multi-pin cable 16 enables transfer of trace data files from a processor core the target system 10 to the host computer 12. In alternative embodiments, the host computer 12 couples to the target system 10 by way of one or more serial cables 18 across which the host computer 12 communicates with the joint test action group (JTAG) communication system, or other currently existing or after developed serial communication system. Serial communication between the host computer 12 and each processor core of the target system 10 on a serial cable 18 has lower bandwidth than a multi-pin connection through illustrative cable 16. Thus, in embodiments where it is not cost-effective to use trace to capture every event of a processor core within a particular time frame, the statistical sampling subsystem (discussed more fully below) of each processor core is configured to statistically sample pertinent data, and transfer the statistically sampled data across its respective serial cable 18. In yet still further alternative embodiments, the multi-pin cable 16 for a particular processor core may have two or more pins dedicated to serial communication, and thus the host computer 12 and each processor core of the target system 10 may communicate using multiple protocols, yet over the same multi-pin cable 16. In yet still other embodiments, interconnects between processor cores on the same integrated circuit enable one processor core to be the recipient of trace data, whether the trace data comprises all the events of a traced processor core or statistically sampled events of the traced processor core.

Figure 2:
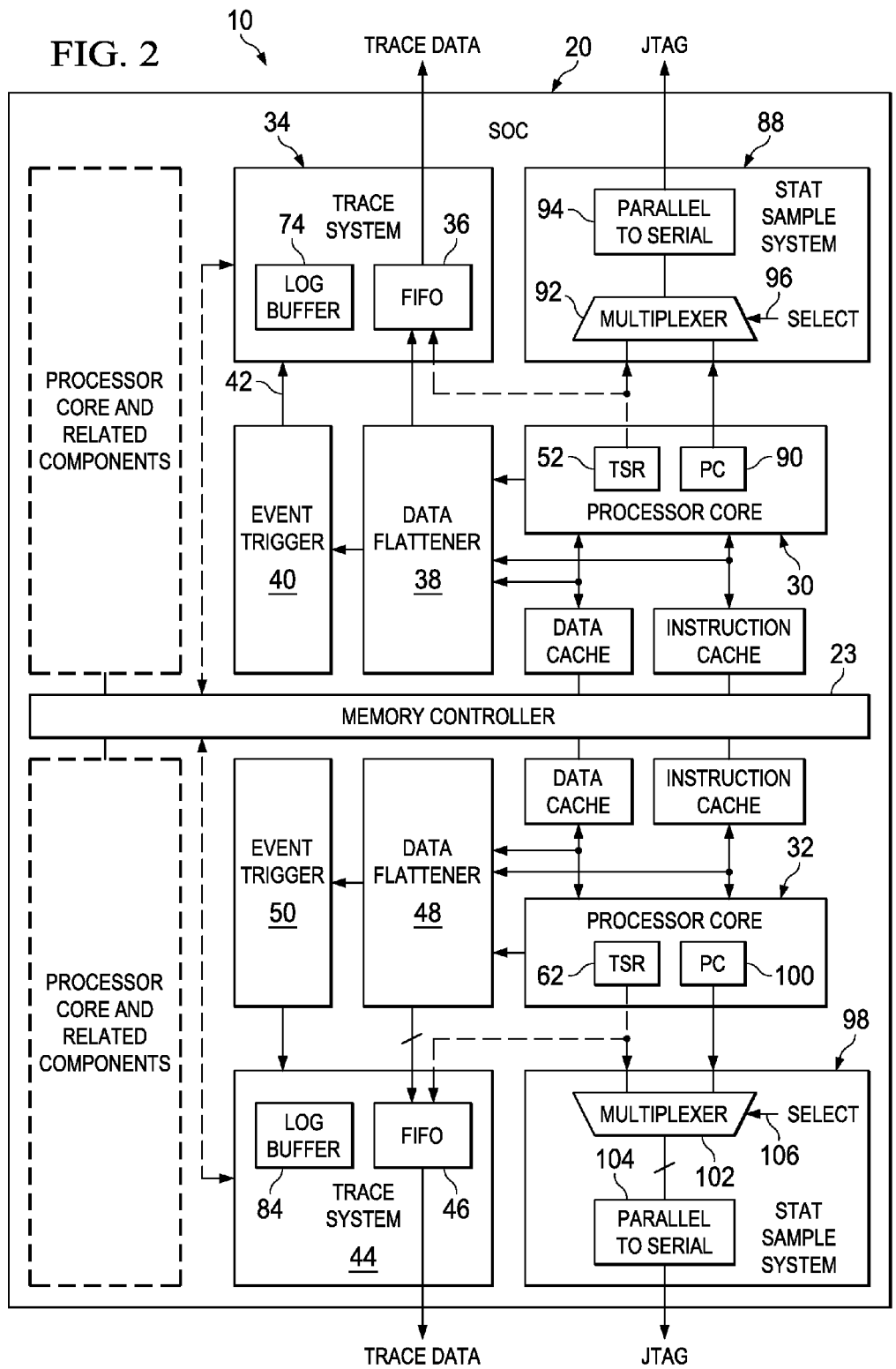
FIG. 2 shows a target system in greater detail.

FIG. 2 shows in greater detail a portion of the target system 10. In particular, a target system 10 in accordance with at least some embodiments comprises a System-On-A-Chip (SOC) 20. The SOC 20 is so named because many devices that were previously individual components are integrated on a single integrated circuit. The SOC 20 in accordance with embodiments of the invention comprises multiple processor cores (e.g., processor cores 30 and 32) which may be, for example, digital signal processors, advanced reduced instruction set (RISC) machines, video processors, and co-processors. Each processor core of the SOC 20 may have associated therewith various systems, but the various systems are shown only with respect to processor cores 30 and 32 so as not to unduly complicate the drawing. A memory controller 23 couples to each processor core. The memory controller 23 interfaces with external random access memory (RAM) (e.g., RAM 21 of FIG. 1), interfaces with RAM on the SOC 20 (if any), and facilitates message passing between the various processor cores. Attention now turns to the specific systems associated with at least some processor cores of an SOC 20.

The following discussion is directed to the various systems associated with processor core 30. The discussion of the various systems associated with processor core 30 is equally applicable to the processor core 32 and any other processor core on the SOC 20. In accordance with some embodiments, processor core 30 has associated therewith a trace system 34. The trace system 34 comprises a First In-First Out (FIFO) buffer 36 in which trace data is gathered. When operating in the trace mode the trace data is sent to the host computer 12 (FIG. 1) by the trace system 34. Because the processor core 30 may perform a plurality of parallel operations, in some embodiments the processor core 30 also couples to a data flattener system 38. As the name implies, the data flattener system 38 gathers the pertinent trace data from the processor core's execution pipeline, serializes or "flattens" the trace data so that events that execute at different stages in the pipeline are logged in the correct sequence, and forwards the trace data to the FIFO buffer 36 in the trace system 34. A non-limiting list of the various data points the data flattener system 38 may read, serialize and then provide to the FIFO buffer 36 is: direct memory access (DMA) trace data; cache memory trace data; addresses of opcodes executed by the processor 30; the value of hardware registers in the processor 30; and interrupts received by the processor 30.

Still referring to FIG. 2, in some embodiments processor core 30 may also couple to an event trigger system 40. The event trigger system 40 couples to the data flattener system 38 and receives a least a portion of the serialized data. In response to various pre-programmed triggers (where such triggers may be communicated to the event trigger system 40 by way of JTAG-based communications or programmed directly by the processor core itself), the event trigger system 40 asserts a trigger signal 42 to the trace system 34. In response, the trace system 34 accumulates trace data in its FIFO buffer 36 and sends the trace data to the host computer 12 (FIG. 1).

Referring simultaneously to FIGS. 1 and 2, a user of the host computer system 12 wishing to debug instructions of processor core 30 enables the event trigger system 40, possibly by JTAG-based communication over a serial cable 18. Thereafter, the user initiates the instructions on the processor core 30. The processor core 30 executes the instructions, while the data flattener system 38 gathers pertinent information, serializes the information, and forwards it to both the event trigger system 40 and the trace system 34. At points in time before the trace system 34 is enabled by the event trigger system 40, the data supplied to the trace system 34 by the flattener 38 may be ignored, discarded or collected such that the trace data comprises events prior to the trigger. At a point in execution of the instructions, the trigger events occur and the trigger events are identified by the event trigger system 40.

When the trigger events occur, the event trigger system 40 asserts the trigger signal 42 to the trace system 34.

In response to assertion of the trigger signal 42, the trace system 34 collects the trace data in the FIFO buffer 36 (possibly together with events that occur prior to the trigger). Simultaneously with collecting, the trace system 34 sends the trace data to the host computer 12. In embodiments where all or substantially all the events after the assertion of the trigger signal 42 are part of the trace data for the processor core 30, the trace system 34 sends the trace data over a relatively high bandwidth multi-pin cable 16. Other embodiments comprise sending the data over optical interconnect to the host computer, or logging the captured trace data in memory or disk that is accessible by the processor core 30 where it can be accessed by another program running on the processor core 30, for example by an embedded software debugging program.

As illustrated in FIG. 2, processor core 32 likewise has a trace system 44, FIFO buffer 46, data flattener system 48 and event trigger system 50. In accordance with embodiments of the invention, the trace system 34 (and related systems and components) associated with processor core 30 and the trace system 44 (and related systems and components) associated with processor core 32 may be simultaneously operational, each sending a separate stream of trace data to the host computer 12. Thus, the debug-trace program 13 of the host computer 12 may have trace data from each processor core of the SOC 20; however, the processor cores of the SOC 20 may operate at different clock frequencies, and may also operate on different instruction streams and data streams. In some cases, a first processor core may perform various tasks to assist a second processor core in completing an overall task. If a problem exists in the instruction stream for the first processor core, the second processor may stall waiting for the first processor core to complete an action (e.g., passing a result or releasing a shared memory location). When debugging in a situation where two or more processor cores are generating trace data, it is difficult to correlate the code executing as between the processor cores to determine which instructions the processor cores were contemporaneously executed. In the case of one processor core stalled waiting on another processor core to complete an activity, it is difficult from viewing only a list of addresses of executed instructions for each processor to determined what activity of the non-stalled processor core caused the stall of the other processor core.

In order to address this difficulty, and in accordance with some embodiments, the integrated circuit SOC 20 may be configured to insert markers or marker values into the trace data of each processor core. The debug-trace program 13 (executing on the host computer 12 or as an embedded debugger) extracts the marker values from the trace data, which enable the debug-trace program to correlate the two sets of trace data to identify contemporaneously executed instructions. The following discussion is again directed to processor core 30 and its related systems, but the description is equally applicable to processor core 32 and its related systems, and any other processor core on the SOC 20. The illustrative trace system 34 obtains each marker value from a target state register (TSR). In some embodiments the target state register is a hardware register located within the processor 30, such as target state register 52. Although the hardware register version of the target state register 52 is shown to couple to the trace system 34 (by way of a dashed line), it will be understood that the value of the target state register may, in actuality, be supplied to the trace system after passing through the data flattener 38. A hardware register may be equivalently referred to as an opcode addressable register. In alternative embodiments, the target state register may be a register outside the processor. For example, and referring briefly to FIG. 1, the SOC 20 may couple to a memory subsystem 21 which implements the target state register 54. In these alternative embodiments, the target state register 54 may be readable by a memory operation to a predefined address within the processor core 30 address space, and thus target state register 54 may be referred to as a memory addressable register. In yet still other embodiments, the memory subsystem 21 may be integrated with other devices of the SOC 20. The trace system 34 is configured to send the value in the target state register 52, 54 to the debug-trace program 13 when the value in the target state register, or a portion thereof, is newly written. Processor core 32 may correspondingly have: target state register 52 within the processor core 32 or a target state register in the memory subsystem 21; and a trace system 44 associated with processor core 32 which trace system 44 sends marker values in the TSR when newly written.

In embodiments where each trace system 34, 44 couples to the host computer 12 by way of the relatively high bandwidth connection, the trace systems 34, 44 are configured to monitor the marker values in their respective target state registers 52, 62 and send the marker values to the host computer system 12. In each case the trace systems 34, 44 send their respective marker values in a message wrapping protocol that identifies to the host computer 12 that the information is the marker from target state register 52, 62. Thus, in these embodiments the marker values in the target state registers are sent across high bandwidth cables (e.g., multi-pin cables 16) along with other trace data (e.g., direct memory access (DMA) trace data, cache memory trace data, addresses of opcodes executed by the processor core (the program counter values), the value of hardware registers in the processor core, and interrupts received by the processor core). The discussion now turns to various embodiments for writing the marker values to each target state register 52, 62.

In some embodiments, each processor core 30, 32 is configured to receive a periodic interrupt. In response to the periodic interrupt, each processor core is configured to load and execute an interrupt service routine which reads the marker value, and then writes the marker value to the target state register of its respective processor. In some embodiments, the interrupts are asserted to each processor 30, 32 substantially simultaneously. In alternative embodiments, the interrupts may be asynchronous with respect to each other, and in some cases may be asserted at different frequencies. In yet still other embodiments, portions of each operating system may be instrumented to write the marker values to the target state registers. For example, the dispatcher program of each operating system may be configured to write the marker value each time a new task is instantiated on its respective processor core. In yet still other embodiments, portions of a user program executing on each processor core may be instrumented to periodically write the marker values to the target state register. The discussion now turns to various embodiments for obtaining the marker values.

Figure 3:
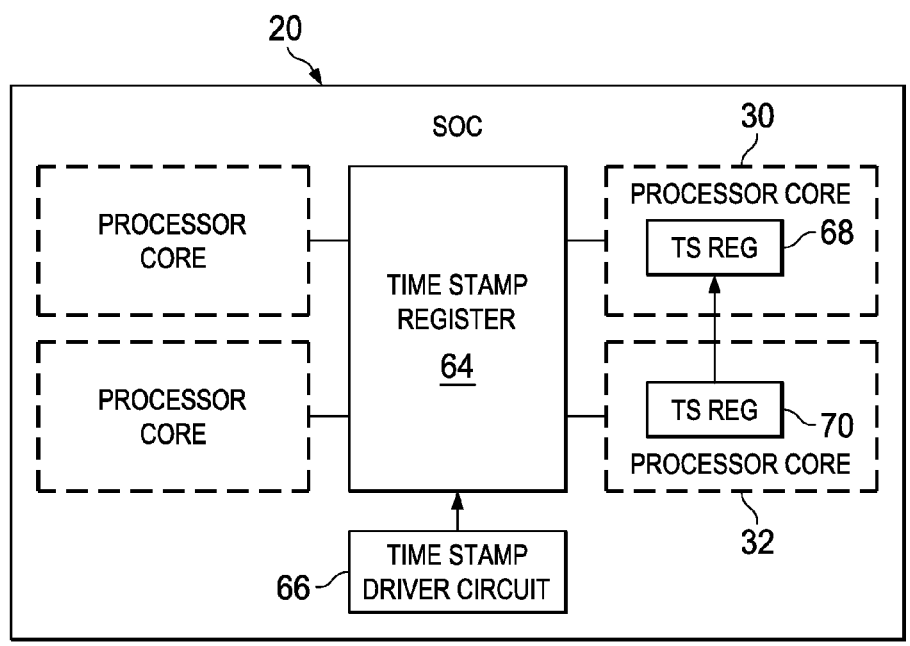
FIG. 3 shows one implementation of the system.

FIG. 3 illustrates a simplified version of the SOC 20 of FIG. 2, along with a timestamp register in accordance with some embodiments of the invention. In particular, FIG. 3 illustrates SOC 20 having a plurality of processor cores, with only processors cores 30 and 32 indicated with reference numbers. Each processor core couples to a timestamp register 64. In some embodiments, the timestamp register 64 is a hardware register, and in other embodiments the timestamp register 64 is a predetermined memory location in shared memory (either on the SOC, or in the external memory subsystem). In accordance with embodiments of the invention, the timestamp register contains the marker value, such as a free running counter value. Each processor core periodically reads the marker value from the timestamp register and inserts the marker value in its trace data stream by writing the marker value into its target state register. The debug-trace program 13 utilizes the marker values as the mechanism to correlate data such that contemporaneously executed instructions are identifiable.

In some embodiments, the SOC 20 comprises a timestamp driver circuit 66 which couples to the timestamp register 64, and periodically updates the marker value in the timestamp register atomically (i.e. in a non-interruptible manner). In other embodiments, one processor core of the SOC 20 is tasked with periodically updating the maker value held in the timestamp register. In embodiments where one processor core updates the marker value, the one processor core receives a periodic interrupt. The periodic interrupt instantiates an interrupt service routine which reads the marker value from the timestamp register 64, increments or decrements the marker value, and then atomically writes the new marker value to the timestamp register 64. Other systems and methods for updating the marker value in the timestamp register may be equivalently used.

FIG. 3 also illustrates alternative embodiments for each processor core obtaining the marker values. In particular, FIG. 3 illustrates each processor core 30 and 32 having timestamp register 68 and 70 respectively. One of the processor cores (e.g., processor core 32) is tasked with periodically updating the marker values in its timestamp register 70, writing the updated marker value to the timestamp register in the second processor core (e.g., processor core 30), and writing the updated marker value to the timestamp registers in other processor cores on the SOC 20.

In order to address situations where the number of bits of the marker value becomes large, or where a majority of bits of the target state register are used for other information, in accordance with some embodiments each marker values is written to a log buffer. A log buffer may be equivalently referred to as a data table, data array and/or data structure. In some embodiments, the marker values the log buffer are read out by the debug-trace program after execution of the target or traced program has stopped. In situations where each log buffer does not contain a sufficient number of storage locations to store all the marker values written during a trace period (e.g., log buffer has too few locations, or the log buffer is circular and the number of entries expected will overwrite earlier entries during the trace period), each log buffer may be read by the host computer 12 one or more times during the trace period to ensure all the entries generated are available to the debug-trace program.

Referring again to FIG. 2, and using the various systems associated with processor core 30 as illustrative of other processors cores, in some embodiments the trace system 34, in addition to the FIFO buffer 36, implements a series of memory locations 74 to be the log buffer. In alternative embodiments, the log buffer is located in RAM, either on the SOC 20 or in the external memory subsystem (FIG. 1). Regardless of the precise location of the log buffer, the debug-trace program has access to the log buffer and can read data from the log buffer as described above. Likewise, trace system 44 has a log buffer 84 where the marker values may be placed. In cases where the log buffer can be read while the processor is running, the log buffer can be periodically read and emptied by the host computer so that the buffer size does not limit the amount of information that can be captured.

The logical construction of the log buffers may take many forms. In some embodiments, the log buffers are implemented as a plurality of equivalently sized data fields. In alternative embodiments, the log buffers are implemented as a plurality of arbitrary sized data fields. In yet still other embodiments, the log buffers are tables each having a plurality of rows and columns. Regardless of the logical construction of the log buffers, in accordance with embodiments of the invention each entry in the log buffer comprises the marker value and an index value. The index value is an index into the log buffer that identifies the location of the entry in the log buffer. The index value could be, for example, a pointer, packet number, sequence number, row number or any other value indicative of the location of the entry. In some embodiments, the index value is an inherent part of the entry, and in other embodiments the index value is generated and written when the marker value is written.

In addition to writing the marker value and possibly the index value in the log buffer 74, each processor core in accordance with embodiments of the invention also places its respective index value in the target state register 52, 62. Writing the index value to the target state register contemporaneously with writing the log buffer ensures that the index value is present in the trace data associated with the traced program. In accordance with some embodiments, the debug-trace program 13 in host computer 12 reads the index value from the trace data, indexes into the log buffer data based on the index value, and thus obtains the marker values. Thus, inserting marker values into the trace data stream comprises not only writing the marker values to the target state registers 52, 62 directly, but also writing the marker values to log buffers and placing index values in the target state registers 52, 62.

In overall software applications using multiple processor cores, one or more of the processors cores may cause other processor cores to stall, and thus slow overall system performance. Stalls can occur for a number of different reasons. For example, a general purpose processor may instruct a special-purpose coprocessor to perform a complex operation that the co-processor is optimized to implement. If a task that is running on the general purpose processor program needs the results of the coprocessor to be available before the general purpose processor can continue execution, the task is said to be stalled, or blocked. Contention over shared resources can also introduce stalls (e.g., systems that use an arbitration mechanism to share a memory device or peripheral can cause one processor to be stalled while another processor accesses the memory device or peripheral). Other examples comprise one processor core waiting for a response from another processor core through an inter-processor communication mechanism (queues, flags, FIFOs, etc.). While the first processor core waits for the second processor core to respond, the first processor core is said to be stalled. Still other examples comprise one processor core waiting for another processor core to come out of a power-down situation or to finish booting after being reprogrammed. A debug-trace program in accordance with embodiments of the invention uses the marker values, and other information, to help the user of the debug-trace program to navigate in the trace data to instructions executed in a non-stalled processor core that caused another processor core to stall. In particular, in accordance with embodiments of the invention when a task executing on a processor core stalls waiting for another processor core (e.g., waiting for the other processor core to provide a value or release a shared memory location), the stalled processor core is configured to write information to its respective target state register 52, 62 which assists the debug-trace program. More particularly still, when one processor core stalls waiting on another processor core, in some embodiments the stalled processor core is configured to write the marker value to the target state register as discussed above, along with its processor identification number, the processor identification number of the processor core on which it is waiting, and an indication that the processor core has stalled (hereinafter stall information). In some embodiments, when the stalled processor core is able again to make forward progress, the formerly stalled processor again writes stall information into the trace data, except in this case the stall information comprises the marker value and an indication that the stall condition has cleared. In alternative embodiments, some or all of the stall information may be written to a log buffer as discussed above.

In order to debug the operation of programmed peripherals and DMA engines, a combination of software instrumentation, CPU-level advanced event triggering and silicon bus monitoring logic may be used. The CP_Tracer silicon module shown in FIG. 4 demonstrates an alternate implementation, and provides dedicated bus monitoring logic that enables bus transactions to be monitored while the device is running. It also can be configured to collect statistics on particular bus transactions and to raise trigger events that can be responded to by other CP_Tracer modules, raise interrupts to any of the CPUs on the device, or raise triggers that can change the state of Advanced Event Triggering state machines on one or more CPUs.

CP_Tracer events and statistics can be output to the system trace either directly or (preferably) to an emulation trace buffer or a region of internal memory without impacting the operation of the device. Multiple CP_Tracer modules may be provided in the system, placed strategically to monitor bus transactions going to particular 'bus slaves' such as shared memory, peripherals, etc.

The CP_Tracer modules can be configured to qualify the statistics and events that it generates based on the bus master ID and the address range of the transaction. This allows the software that configures the peripheral/DMA engine to configure the CP_Tracer module associated with the destination of the data transfer to monitor the transactions originating from that peripheral/DMA engine.

The software on the CPU may configure the CP_Tracer module's sliding time window to have a period equal to the worst-case time period that a transfer needs to be completed by. A chained DMA transaction may be configured to write into the CP_Tracer's configuration registers in order to disable the sliding time window when the transaction completes in order to prevent it from expiring. Alternatively, an interrupt service routine on the CPU may disable the CP_Tracer upon notification from the DMA that the transaction had completed on time. If the transaction did not complete in a timely manner, the CP_Tracer sliding time window will expire and will automatically log the event via the System Trace that contains statistics collected during the time interval.

CP_Tracer statistics of interest include the number of bytes sent by the DMA engine and the number of bytes sent by all bus masters, providing some insight into whether the delay can be attributed to the bus being too busy. Alternatively, a second statistic can be used to monitor a specific bus master or set of bus masters that are likely to be hogging the bus.

When the sliding time window expires, it can optionally be configured to automatically halt/freeze the logged software and hardware events without software involvement. This is particularly useful when the problem has impacted the ability of the CPU to operate properly. It allows hardware events and statistics and software events leading up to the missed deadline to be captured and uploaded for off-line analysis.

The ability to correlate the hardware events and statistics with software events from all of the CPU cores and the CPU trace from all of the cores allows software tooling to reconstruct the events leading up to the problem or the missed deadline. Software events can periodically log performance counter values including cache statistics to provide additional insight into the behavior of the device over time, allowing potential causes for the delays or improper operation to be identified, either by the user looking at transaction graphs of events over time, or by automatic means using software that filters out 'normal' operational behavior from 'abnormal' operational behavior.

Figure 4:
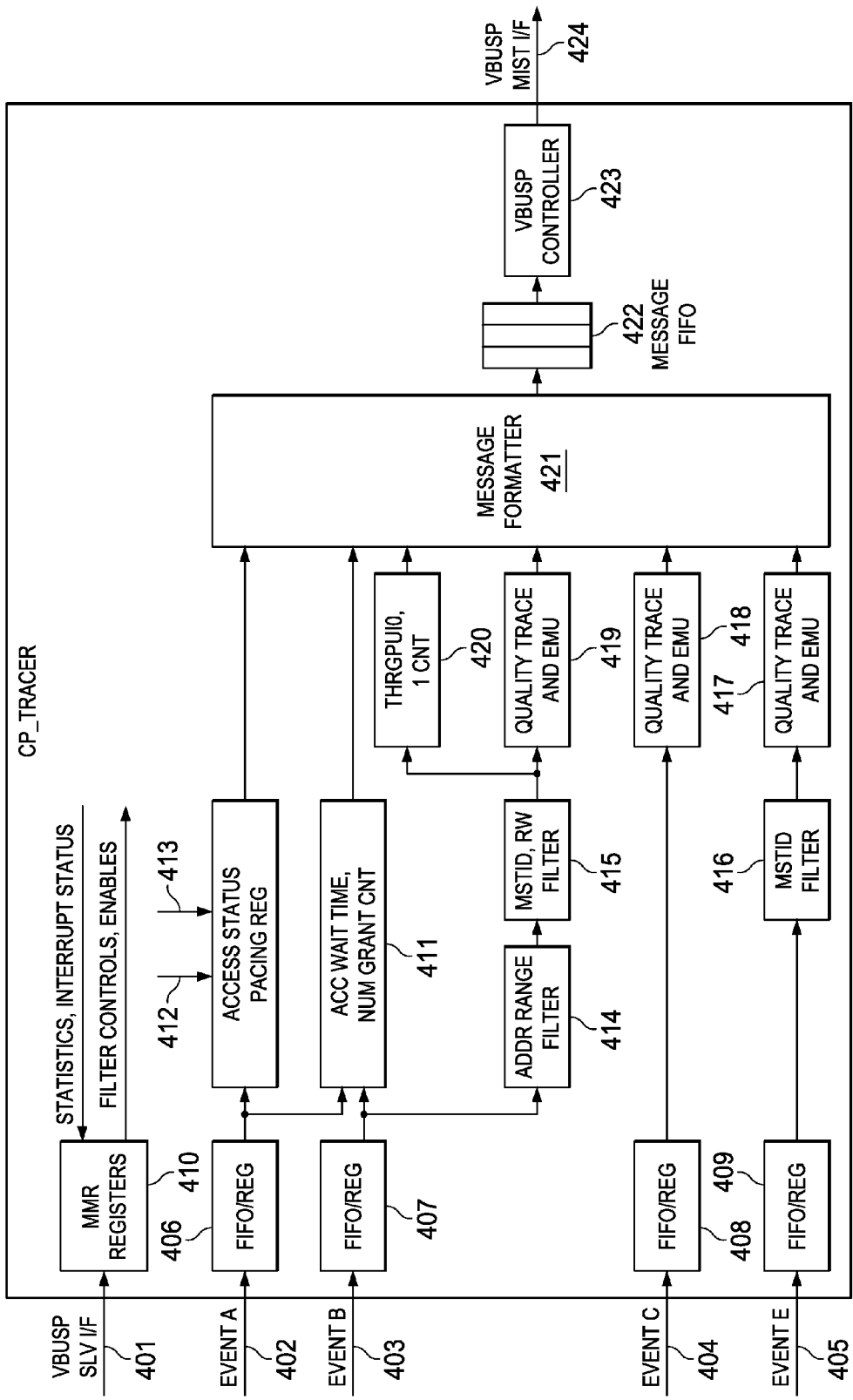
FIG. 4 shows a high level block diagram of the CP-Tracer module described in the invention.

A high level block diagram of the CP_Tracer module is shown on FIG. 4. Input 401 is the slave input interface, inputs 402 through 404 are event inputs A through C, and input 405 is event input E. Event input 412 (F) and event input 413 (G) connect directly to block 411. The function of the event inputs is shown in Table 1. Event inputs 402 - 405 connect to Fifo registers 406-409 to buffer the input signals, and slave input interface 401 connects to setup and status register block 410. Block 411 contains a 24 bit counter that is used to accumulate the number of cycles a request is waiting until arbitration. The counter is enabled by a software loadable register bit, and is reset when the sliding timer window expires. The accumulated wait time is calculated by tracking the number of event A, event B, event E and event F arrivals. The number of pending requests is incremented any time a new request event occurs on the event A 402 interface, and the number of pending requests is decremented when a request event occurs on the event B 403 interface, or when an event F 412 (write merged) or event G 413 (command discarded) occurs. The following pseudo code shows how the accumulated wait time and the number of grants are calculated:

```
for (n=0; n< # event A i/f; n++)
{
            If (event A is triggered) numPending ++;
            If (event F is triggered and numPending > 0)
            numPending --;
            If (event G is triggered and numPending > 0)
            numPending --;
}
If(event B and arb_last)
{
   num_granted ++;
   If(numPending > 0)
   {
            numPending --;
   }
}
If(numPending > 0) wait_time ++;
```

Block 411 also contains a second 24 bit counter (Num Grant Counter) that is used to count the number of times arbitration has been granted. This counter is enabled by a software register bit, and is reset when the sliding timer window expires.

The CP_Tracer's statistics counters allow the following statistics to be calculated:

Bus bandwidth to slave used by one or more selected bus masters (bytes/sec)=throughput for bus master/sliding time window duration Average access size=throughput byte count/number of accesses granted Bus utilization (transactions per second)=Number of accesses granted/sliding time window duration Percentage of time there was contention for the bus= (accumulated wait time/sliding window length in cycles)*100

Minimum Average Latency=Accumulated Wait Time/ number of accesses

Percentage of bus throughput used by bus master= (throughput for a bus master/throughput for all bus masters)*100 sliding time window duration=sliding time window period in cycles/number of cycles per second The Minimum Average Latency is not a true average arbitration latency, since it ignores the cycle counts where multiple bus masters are waiting at the same time. It will typically be lower than the true average latency.

The throughput count represents the total number of bytes forwarded to the target slave during the specified time duration. This counter accumulates the byte count presented to the slave interface. This count can be used to calculate the effective throughput in terms of Mb/s at a given slave interface. There are 2 throughput counters in Block 420 (0 and 1) that can be individually enabled by software control bits. The counters are each filtered by a set of mstids in Blocks 415 and 416 programmed via MMR registers in Block 410. The throughput counters are also filtered by a programmable address range in Block 414, quality trace and EMU in Blocks 417, 418 and 419, and by read/write transaction type in Block 415.

TABLE 1

| EVENT | SIGNAL NAME | WIDTH | FUNCTION |
|---|---|---|---|
| EVENT A | | | |
| Master requesting to slave | event_<mst>_<slv>_req_evt | 1 | This event triggers when there is a new request from the master decoded to the slave. |
| EVENT B | | | |
| New request to slave | event_<slv>_arb_evt | 1 | This event triggers when a transaction is sent to the slave. The associated master ID and transaction ID are valid when arb_evt = 1. |
| | event_<slv>_arb_last | 1 | This indicates that this is the last arb event for a given command. |

TABLE 1-continued

| EVENT | SIGNAL NAME | WIDTH | FUNCTION |
|---|---|---|---|
| | event_<slv>_arb_mstid | 8 | Associated master ID with the arb event |
| | event_<slv>_arb_dir | 1 | Associated direction with the arb event |
| | event_<slv>_arb_dtype | 2 | Associated dtype/cdtype with the arb event |
| | event_<slv>_arb_xid | 4 | Associated transaction ID with the arb event |
| | event_<slv>_arb_address | 48 | Address with the arb event |
| | event_<slv>_arb_bytecnt | 10 | Bytecnt with the arb event |
| EVENT C | | | |
| Last write data to slave | event_<slv>_wlast_evt | 1 | This event triggers when the last write data is sent to the slave, thus completing the write burst. |
| EVENT E | | | |
| Last read data from slave | event_<slv>_rlast_evt | | This event triggers when the last read data arrives at the slave interface, thus completing the read burst. Associated mstid and xid are valid when rlast evt is high. |
| | event_<slv>_rd_mstid | 8 | Associated master ID with the rfirst or rlast event |
| | event_<slv>_rd_xid | 4 | Associated transaction ID with the rfirst or rlast event |
| EVENT F | | | |
| | event_<mst>_<slv>_merge_evt | 1 | Indicates that a write request from <mst> to <slv> has been merged with another request |
| EVENT G | | | |
| | event_<mst>_<slv>_disc_evt | 1 | Indicates that a read request from <mst> to <slv> has been discarded. |

The sliding time window specifies the measurement interval for all statistic counters implemented in the CP_TRACER module. The sliding time window is specified in number of CP_TRACER clock cycles. All the counters that are enabled start counting at the first transaction after the sliding window begins. When the sliding window timer expires, the counter values are loaded into the respective registers and the count starts again. If enabled, an interrupt is also generated when the sliding time window expires. The host CPU can read the statistics counters upon assertion of the interrupt. The sliding time window is by default disabled at reset and begins counting as soon as a non-zero value is written into the sliding time window register in Block 410. After it is enabled, the sliding time window can be disabled by writing 0x00000000 into the register.

The following filtering modes are applied to either statistics generation or exporting event traces.
Filtering based on mstid on events B and E
Filtering based on read/write on event B
Filtering based on dtype on event B
Filtering based on address range (inclusive of addresses within the range and exclusive outside the range) on event B
Filtering based on EMU0/1 control inputs on all events B, C and E If any bytes of a transaction fall within the address window (or outside for exclusive address filtering) then that transaction will count as passing the address range filter. Only the bytes that pass the address range filter will count towards throughput calculations. This means that it's possible for only some of the bytes of a transaction to be counted in the throughput counters. Example: Assuming all other qualifiers are met, if a transaction starts outside of the address window but ends inside, and exclusive address filtering is off, then those bytes that fall inside the address window will be added to throughput.

The CP_Tracer will export 3 types of messages through the VBUSP interface 424:

Status Message

A status bit for every event A i/f is used to track any new request event. A '0' indicates that no new request events occurred and a '1' indicates that one or more new request events have occurred.

Due to bandwidth concerns, the CP_Tracer also needs to implement some pacing scheme to control the bandwidth consumed by exporting event A. This can be done by exporting the status message only if the following 2 conditions are met.

1. At least one of the status bit is set to one, and
2. The previous status message was exported x cycles before (x can be configurable via the MMR register 410) or the sliding time window expires.

Event Message

Events B, C and E are exported in the event message after applying the selected filters.

Statistics Message

This message exports the throughput statistics for 2 groups of mstid, accumulated wait time for arbitration and number of times arbitration has been granted. These are exported when the sliding timer expires.

Cross Triggering

Cross triggering involves using an external trigger to start and stop monitoring. The emu0_in line is trace start and emu1_in is trace stop. Both signals are asynchronous and active low. If Qualif_EMU is set, only transactions happening between an emu0_in low pulse and an emu1_in low pulse will be traced for event export and statistics.

The emu*_in signals are typically sourced by the Debug Subsystem, which routes them from either GEM emu signals or from another CP_Tracer. The emu*_in signals are asynchronous and active low. They are synchronized to the CP_Tracer clock, so it is the responsibility of the source to make sure the low pulses are long enough to be captured. For instance, if the source is on a clock CLK1 and the CP_Tracer is on clock CLK1/3, then the source's pulse must be 3 CLK1 cycles long (equivalent to 1 CLK3 cycle). Because the events are synchronized, events that happen too close together may not be recognized due to synchronizer delay. For instance, if an emu1_in (emulation trace disable) comes too close following an emu0_in (emulation trace enable), tracing will not be disabled. The tracer will miss this event and continue on until another emu1_in low pulse is detected.

Note that emulation triggering has no effect on the export of statistics messages being exported based on the sliding time window. When using cross triggering, statistics will only be gathered between a trace start and trace stop, but the statistics messages themselves will continue to be exported at the end of the sliding time window. The EMU_status bit of the Transaction Qualifier Register indicates whether tracing is enabled.

CP_Tracer also has the ability to assert emu0_out and emu1_out triggered by a qualified event B and enabled by the EMU0_trigger and EMU1_trigger bits in the transaction qualifier register. A qualified event B means that all of the following filters have been applied:
1. Corresponding emu0/1 trigger from the transaction qualifier register
2. Address filtering
3. MSTID select registers for Throughput0
4. Qualif_trig and dir from the transaction qualifier register
5. Qualif_dtype_trig and dtype from the transaction qualifier register EMU0/1_out are active low pulses. The length of the pulses is determined by the emu_pulse_len input. The length of the low pulse is emu_pulse_len+1. emu_pulse_len is 3 bits and can be any number from 0-7 corresponding to a pulse length from 1-8.

EMU0/1_out pulses are cumulative. This means that if the pulse length is set to 5, and there is a qualified event followed by another qualified event 3 cycles later, then the length of the low pulse will be 8 cycles. The first event will start a 5 cycle pulse, but the $2^{nd}$ event 3 cycles later will reset this count to 5, meaning you get 3 cycles from the first pulse and 5 cycles from the second combining for a total of 8 clock cycles on the pulse. More than two pulses can be combined also.

The VBUSP i/f 423 is a write-only 32-bit transfer controller. The transfer controller will issue a transaction if there is 1 or more elements in the message Fifo 422. The interface is burst-capable and can issue a burst transaction if there is more than 1 message pending in the message Fifo 422. The maximum burst size is 16 bytes. The following attributes define the VBUSP i/f:
 a.) Write-only interface
 b.) Linear incrementing bursts only
 c.) Address (based on programmed destination address value)
 d.) No gap in byte enables. Maximum burst size of 16 bytes
 e.) No support for write status interface
 f.) No error logging
 g.) Address must be word aligned

What is claimed is:

1. A bus monitoring system of a multiprocessor system including a plurality of bus masters and at least one slave connected by a bus comprising of:
 a first input configured to receive control, timing and setup information to the bus monitoring system,
 at least one second input configured to receive data from the bus,
 a plurality of registers, counters and timers configured via the first input to collect and calculate timing, performance and statistics information from the at least one second input,
 a first-in-first-out buffer connected to the plurality of registers storing the collected and calculated timing, performance and statistics information, and
 an output connected to the first-in-first-out buffer outputting the collected and calculated timing, performance and statistics information.

2. The bus monitoring system of claim 1 wherein at least one of the plurality of bus masters generates a write burst to a slave, further comprising:
 an input (Event C) configured to provide an indication of a last data write of a write burst to a slave.

3. The bus monitoring system of claim 1 wherein at least one of the plurality of bus masters generates a read burst from a slave, further comprising:
 an input (Event E) configured to provide an indication of a last data read of a read burst from a slave.

4. The bus monitoring system of claim 1 wherein:
 the plurality of registers, counters and timers are configured via the first input to
  detect the occurrence of a predetermined event on one of the second inputs,
  set a predetermined duration of a programmable counter, and
  start data collection and the programmable counter on the occurrence of the predetermined event on one of the inputs, and
  terminate data collection at the expiration of the programmable counter.

5. The bus monitoring system of claim 1 wherein:
 said at least one second input consists of a plurality of second inputs;
 the plurality of registers, counters and timers are configured via the first input to
  detect the occurrence of a predetermined first event on one of the second inputs,
  detect the occurrence of a predetermined second event on another of the second inputs,
  start data collection on the occurrence of the first event, and
  terminate data collection on the occurrence of the second event.

6. The bus monitoring system of claim 5 wherein the system is operable to collect the following statistics:
 bus bandwidth to a slave used by one or more selected bus masters in bytes/second calculated as throughput of the selected bus master/a sliding time window duration between the start of data collection upon occurrence of the first event and the termination of data collection on the occurrence of the second event.

7. The bus monitoring system of claim 5 wherein the system is operable to collect the following statistics:
 bus utilization calculated as a number of granted accesses/a sliding time window duration between the start of data collection upon occurrence of the first event and the termination of data collection on the occurrence of the second event.

8. The bus monitoring system of claim 5 wherein the system is operable to collect the following statistics:
percentage of time there was contention for the bus calculated as (accumulated wait time/a sliding window length in clock cycles)*100, wherein the sliding window length is a duration between the start of data collection upon occurrence of the first event and the termination of data collection on the occurrence of the second event.

9. The bus monitoring system of claim 5 wherein the system is operable to collect the following statistics:
a sliding time window duration calculated as sliding time window period in cycles/number of cycles per second between the start of data collection upon occurrence of the first event and the termination of data collection on the occurrence of the second event.

10. The bus monitoring system of claim 1 wherein the system is operable to collect the following statistics:
average access size calculated as the throughput of byte count/number of accesses granted.

11. The bus monitoring system of claim 1 wherein the system is operable to collect the following statistics:
minimum average latency calculated as accumulated wait time/number of granted accesses.

12. The bus monitoring system of claim 1 wherein the system is operable to collect the following statistics:
percentage of bus throughput used by a bus master calculated as (throughput for selected bus master/throughput for all bus masters)*100.

13. The bus monitoring system of claim 1 wherein the information collected is filtered based on the following parameters:
master ID on event B input.

14. The bus monitoring system of claim 1 wherein the information collected is filtered based on the following parameters:
master ID on event E input.

15. The bus monitoring system of claim 1 wherein the information collected is filtered based on the following parameters:
read or write events on event B input.

16. The bus monitoring system of claim 1 wherein the information collected is filtered based on the following parameters:
transaction type on event B input.

17. The bus monitoring system of claim 1 wherein the information collected is filtered based on the following parameters:
address range on event B input.

18. The bus monitoring system of claim 1 wherein the information collected is filtered based on the following parameters:
control inputs on all B, C, and E events.

19. The bus monitoring system of claim 1 wherein the output is operable to output a status message showing event A requests.

20. The bus monitoring system of claim 1 wherein the output is operable to output events B, C and E after applying any applicable filters.

21. The bus monitoring system of claim 1 wherein the output is operable to output a statistics message showing throughput statistics for selected master IDs.

22. The bus monitoring system of claim 1 wherein:
said at least one second input consists of a plurality of second inputs;
the plurality of registers, counters and timers are configured via the first input to
detect the occurrence of a predetermined first event on one of the second inputs,
detect the occurrence of a predetermined second event on another of the second inputs,
set a predetermined duration of a programmable counter, and
start data collection on the occurrence of the predetermined first event,
terminate data collection at the first occurring of the predetermined second event or the expiration of the programmable counter, and
logging an event failure if the programmable counter expires before occurrence of the predetermined second event.

23. The bus monitoring system of claim 22, wherein:
the multiprocessor system includes a programmable direct memory access unit for making programmed data transmissions via the bus,
the predetermined first event is the beginning of a predetermined data transfer by the direct memory access unit, and
the predetermined second event is the completion of the predetermined data transfer by the direct memory access unit.

24. The bus monitoring system of claim 1, wherein:
the multiprocessor system includes a target state register storing a marker value, and
the plurality of registers, counters and timers are configured via the first input to
detect the occurrence of a change of the marker value stored in the target state register, and
store the changed marker value stored in the target state register into the first-in-first-out buffer for output via the output.

* * * * *